(12) United States Patent
Manoharan et al.

(10) Patent No.: US 10,489,603 B2
(45) Date of Patent: Nov. 26, 2019

(54) METHOD AND APPARATUS FOR IMAGE PRIVACY PROTECTION

(71) Applicant: KBYTES SOLUTIONS PRIVATE LIMITED, Madurai (IN)

(72) Inventors: Karthikeyan Manoharan, Toronto (CA); Balasubramanian Manoharan, Madurai (IN)

(73) Assignee: KBYTES SOLUTIONS PRIVATE LIMITED, Madurai (IN)

( * ) Notice: Subject to any disclaimer, the term of this patent is extended or adjusted under 35 U.S.C. 154(b) by 134 days.

(21) Appl. No.: 15/555,437

(22) PCT Filed: Feb. 20, 2016

(86) PCT No.: PCT/IB2016/050921
§ 371 (c)(1),
(2) Date: Sep. 1, 2017

(87) PCT Pub. No.: WO2016/147066
PCT Pub. Date: Sep. 22, 2016

(65) Prior Publication Data
US 2018/0046814 A1 Feb. 15, 2018

Related U.S. Application Data

(60) Provisional application No. 62/135,401, filed on Mar. 19, 2015.

(51) Int. Cl.
G06F 21/62 (2013.01)
G06F 21/10 (2013.01)
(Continued)

(52) U.S. Cl.
CPC .............. *G06F 21/62* (2013.01); *G06F 21/10* (2013.01); *G06F 21/602* (2013.01);
(Continued)

(58) Field of Classification Search
CPC .. G06F 21/6209; G06F 21/10; G06F 21/6218; G06F 21/62; G06F 21/602;
(Continued)

(56) References Cited

U.S. PATENT DOCUMENTS 8,744,143 B2 6/2014 Chen
2001/0014156 A1* 8/2001 Murakami .............. H04L 9/083
380/277
(Continued)

FOREIGN PATENT DOCUMENTS

EP 0614308 A1 * 9/1994 ........... H04N 1/4413
WO WO-2014/114987 7/2014

OTHER PUBLICATIONS

International Search Report and Written Opinion dated Jun. 3, 2016, PCT Patent Application No. PCT/IB2016/050921, filed Feb. 20, 2016, Canadian Intellectual Property Office.

*Primary Examiner* — Theodore C Parsons
(74) *Attorney, Agent, or Firm* — Arash Behravesh; Mannava & Kang, P.C.

(57) ABSTRACT

A method and apparatus for protecting the details of an image to ensure privacy of the image by generating a protected image from an original image is disclosed. The method includes generating a preview image from an original image and applying 5 effects to the preview image so as to obscure the preview image. The original image is encrypted using an encryption key and stored as non-visual metadata of the preview image. The encryption key is encrypted using one or more key encryption key (KEK), and the encrypted encryption keys is also stored in the metadata of the preview image. Any image viewer will display the preview image. The key encryption 10 key is generated based on a passphrase or based on the encryption key of another protected image. Instances of the protected image (Continued)

called profile and cover images is used to provide logical groupings and share access to protected images.

14 Claims, 8 Drawing Sheets

(51) Int. Cl.
  *G06F 21/60* (2013.01)
  *G09C 5/00* (2006.01)
  *H04L 9/08* (2006.01)

(52) U.S. Cl.
  CPC ...... *G06F 21/6209* (2013.01); *G06F 21/6218* (2013.01); *G09C 5/00* (2013.01); *H04L 9/0822* (2013.01); *H04L 9/0863* (2013.01); *G06F 2221/2107* (2013.01)

(58) Field of Classification Search
  CPC .......... G06F 2221/2107; H04N 1/4486; H04L 9/0863; H04L 9/0822; G09C 5/00
  See application file for complete search history.

(56) References Cited

U.S. PATENT DOCUMENTS

| | | | |
|---|---|---|---|
| 2002/0194134 A1* | 12/2002 | Ohtsuka | G06F 21/10 705/57 |
| 2003/0190042 A1* | 10/2003 | Tagashira | H04N 21/234327 380/45 |
| 2009/0214033 A1* | 8/2009 | Nakagata | G09C 5/00 380/243 |
| 2012/0293654 A1 | 11/2012 | Ikegami | |
| 2014/0140575 A1 | 5/2014 | Wolf | |
| 2016/0050341 A1* | 2/2016 | Erdler | H04N 1/444 380/245 |
| 2016/0294781 A1* | 10/2016 | Ninan | H04L 63/0407 |

\* cited by examiner

METHOD AND APPARATUS FOR IMAGE PRIVACY PROTECTION

FIELD OF INVENTION

The present disclosure relates to protection of image privacy system, and in particular, discloses an apparatus for the protection of visual details of the image as well as and non-visual information (meta data) such as where and when image was captured, when it was uploaded, GPS data, and kind of device used to capture it.

BACKGROUND OF THE INVENTION

In the progress of an information-oriented society, leakage of information present in images becomes a serious problem and development of a technology for preventing information leakage is demanded. Machine reading or human analysis of images can disclose Information that is present in the image and can reveal details regarding the subject, place, time, location and other information that can be gathered from the image.

File encryption solutions considers images as data file and hence images cannot be previewed after encryption. Without image preview there is no context for the encrypted image and is identified only with its file name.

On a search of prior art patents, it is seen that a number of patents are there in the field of image processing method and apparatus for privacy protection of details of images. Patent numbers EP 2791855 A4; US 20130283061 A1; US 20140140575 A1; US 20110096922 A1; US 20120250951 A1; US 8830221 B2; and WO 2014028009 A1; are mentioned here by way of reference. Though these Patents/Patent applications can be considered relevant, as they define the general state of the art, they cannot be considered to have any particular relevance to the present invention.

To obviate the drawback of the existing system, we have come out with an image protection system, which encrypt the image as image, which is visible on image viewer as preview image. Said preview image provides a context for the encrypted image without revealing finer detail and enables the user to identify the content of image without decrypting the same and the original Image is viewed with this apparatus or method by decrypting with proper authentication.

OBJECTS OF INVENTION

Therefore, the main objective of the present invention is to provide a unique system or method to prevent leakage of information from images and the apparatus for the same.

Another objective of the present invention is to provide an apparatus or method to secure images at rest and transit.

One more objective of the present invention is to have a system that is capable of previewing the encrypted images to establish context of the image without decrypting its content.

Still one more objective of the present invention is to provide an apparatus and method to view an original image only after authentication.

Yet another objective of the present invention is to provide an apparatus or method for multiple authentication method to encrypt and decrypt images.

Yet another objective of the present invention is to provide an apparatus or method for a master password to decrypt any image encrypted by user.

The above objectives of the present invention have been achieved because of our extensive R&D effort and trials carried out at our end.

SUMMARY OF THE INVENTION

Present invention relates a method and apparatus for protecting the visual details of the image as well as and non-visual information (Meta data) such as where and when image was captured, when it was uploaded, GPS data, and kind of device used to capture it. It ensures privacy of the image by generating a protected image from an original image. The method includes generating a preview image from an original image and applying effects to the preview image so as to obscure the preview image. The original image is encrypted using an encryption key and stored as non-visual metadata of the preview image. The encryption key is encrypted using a key encryption key, and the encrypted encryption key is stored in the metadata of the preview image. Any image viewer will display the preview image. The key encryption key is generated based on a passphrase or based on the original encryption key of another protected image. Instances of the protected image called profile and cover images is used to provide logical groupings and share access to protected images.

According to an aspect of the present invention, there is provided a mechanism to secure the input image to prevent leakage of information by encrypting the image and embedding in a preview image.

According to another aspect of the present invention, there is provided a privacy protection system protecting the visual information from the input image by displaying as preview image and or with effects to prevent machine reading.

According to an aspect of the present invention, Encrypted images are stored in a format that on image viewer displays the preview image, which provide a context and the original Image is viewed with this apparatus or method by decrypting with proper authentication.

According to yet another aspect of the present invention, images are encrypted on a specific format to prevent machine reading and remain secure during storage and transit.

BRIEF DESCRIPTION OF THE DRAWINGS

These and other features, aspects and advantages of the present invention will be understood better, when the detailed description is read with reference to the accompanying drawing.

DETAILED DESCRIPTION OF THE INVENTION

In accordance with the invention a novel method and apparatus for image privacy protection that encrypts image so that it is visible on any image viewer as preview image. The preview image provides a context for the original image enabling the user to identify the content of image without decrypting the same. Here we secure the input image and prevent leakage of information by encrypting the image and embedding in a preview image. Hence, the privacy is ensured by protecting the visual information from the input image by displaying as preview image and/or with effects to prevent machine reading and remain secure during storage and during transit. The encrypted images are stored in a format that on image viewer displays the preview image, which provide a context and the original Image viewed by decrypting with this apparatus using the key encryption key or passphrase. Now we will describe the invention in more detail.

Figure 1:
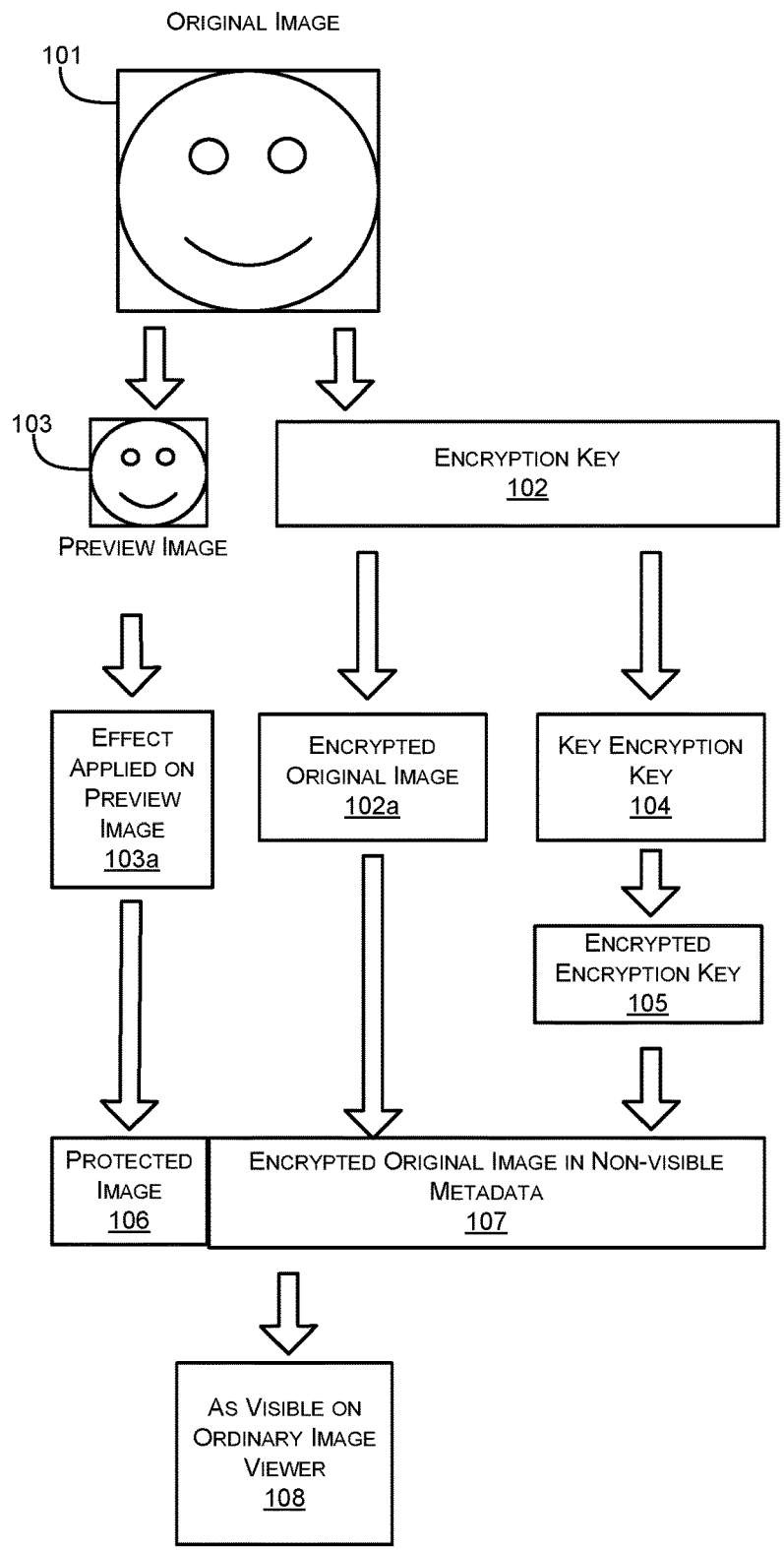
FIG. 1 is a block diagram illustrating a method of generating a protected image.

With reference to FIG. 1, an image termed an "original image" (101), is encrypted with an encryption key, termed as an "encryption key" (102) to generate an encrypted original image (102a). A "preview image" (103) is generated based on the original image by applying one or more effects to obscure details of the original image (103a). For example, the preview image comprise a different image or the original image which has had applied to its effects like blurring, smudging, contrast, and color modification, or other modifications, so as to obscure details of the original image. The encryption key is encrypted using a second encryption key termed a "key encryption key" (KEK) (104) to generate an encrypted encryption key (105). The encrypted original image and the encrypted encryption key(s) is embedded in non-visible metadata (107) of the preview image. The preview image embedded with the encrypted original image and the encrypted encryption keys is termed a "protected image" (106). Such a protected image when viewed on any image viewer (108) will display as preview image and not the original image.

Image Protection Apparatus

Figure 2:
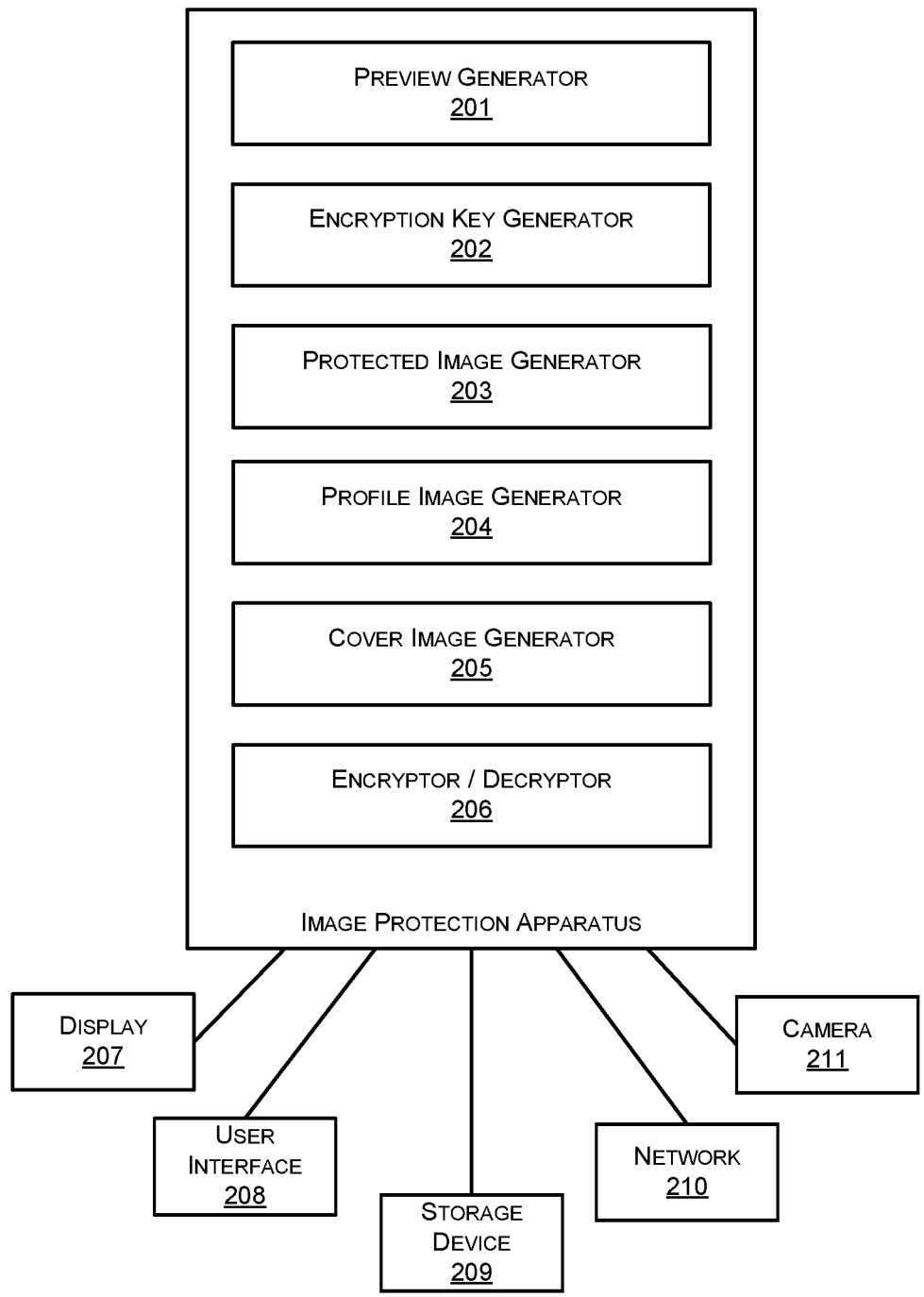
FIG. 2 is block diagram showing an image protection apparatus.

An image protection apparatus is shown in FIG. 2. The image protection apparatus includes or be implemented in a processor connected to a memory storing computer-readable instructions executable by the processor to implement or provide the image protection apparatus, one or more components of the image protection apparatus, or one or more of the functions of the image protection apparatus as described herein. Moreover, the image protection apparatus includes one or more specialized hardware components, such as one or more application-specific integrated circuit, configured to provide one or more such components or perform one or more such functions. The image protection apparatus may interface with a display (207), a user interface (208), a storage device (209), a network (210), a camera (211), or another other component for enabling or cooperating with the components and functionalities disclosed herein.

As shown in FIG. 2, the image protection apparatus includes one or more of a preview generator (201), an encryption key generator (202), a protected image generator (203), a profile image generator (204), a cover image generator (205), and an encryptor/decryptor (206).

Preview Generator (201)

The preview generator receives an original image—for example from the storage device, network, or camera—and generates a preview image based on different image or the original image by applying one or more effects such as blurring, smudging, modifying contrast, changing color, neutralizing color, cropping, or other effects so as to obscure or otherwise modify the image such that all or a number of details in the original image are not visible in the preview Image. Preview generator can also use different image as a preview for the original image.

Encryption Key Generator (202)

The encryption key generator generates an encryption key used to encrypt original images. The encryption key generator also generates key encryption keys (KEK) based on passphrase, or based on encryption key which is used to encrypt a different original image, such as in the case of a "profile image" or "cover image" disclosed herein.

Profile image and cover image is itself a protected image. One or more protected images are associated with one or more profile images such that a user who authenticates the profile image can decrypt and view the original images of the associated protected images. The encryption key of the profile image is the KEK to decrypt encrypted encryption key to derive encryption key of the protected image. Alternatively or additionally, one or more protected images is associated with one or more cover image, such that a user who authenticates one of the cover images can decrypt the encryption key of protected images as the encryption key of the cover image is the KEK to decrypt the encryption key of the protected images. Cover image provides a convenient way to share a group of images with others. Profile images provide a convenient way to share protected images with multiple devices of the user.

Protected Image Generator (203)

Consistently with the foregoing, one or more protected images are associated with one or more profile images or cover images. Protected image stores in its metadata, one or more encrypted encryption keys, encrypted with the KEK, which is based on encryption key of profile image and/or cover image. To decrypt the protected image, user would require the encryption key of profile or cover image to decrypt its encryption key and the original image is decrypted with this encryption key.

Profile Image Generator (204)

The profile image generator generates "profile image" as described herein. A profile image comprises a protected image used to relate and enable access to one or more associated protected images and/or cover image and/or other profile image. The KEK of the associated protected images is encryption key of profile image. When used for this purpose, the encryption key of the profile image is termed as "profile encryption key". Authenticating the profile image thus generates the profile encryption key, which is the KEK of the associated protected images to decrypt their respective encryption keys to decrypt their respective original images. As with any protected image, the profile encryption key is encrypted by a KEK that is based on a passphrase or based on profile encryption key of another profile image.

Cover Image Generator (205)

The cover image generator generates a "cover image" as described herein. As with a profile image, a cover image is itself a protected image used to relate and enable access to one or more associated protected images. A cover image is associated with a profile image where the profile encryption key is the KEK to derive one of the encrypted encryption key of the cover image. Protected image is associated with a cover image when encryption key of the cover image is the KEK to derive on the encrypted encryption key of the protected image. The encryption key of cover image is termed as "cover encryption key". A user capable to authenticate the cover image by providing a passphrase or encryption key needed to decrypt the cover encryption key—is therefore capable of decrypting the protected images.

Cover image is associated with a profile image when profile encryption key is the KEK to encrypt the cover encryption key. One or more such encrypted cover encryption key is stored in cover image. When more than one encrypted cover encryption key encrypted by a profile encryption key, authentication either one of the profile images provides access to the cover image, and thus to all of the protected images associated with the cover image.

Encryptor/Decryptor (206)

The encryptor encrypts original images using an encryption key generated from the encryption key generator and stores the encrypted original images as non-visual data along with the other information generated by the encryption key generator in such a way that when the protected image is viewed using any image viewer, the preview image is displayed, and the protected image is decrypted as disclosed herein based on a passphrase or availability of one or more KEKs to decrypt the encrypted encryption key stored in the protected image and encryption key is used to decrypt the original image.

Profile Image Encryption/Generating Method

Figure 3:
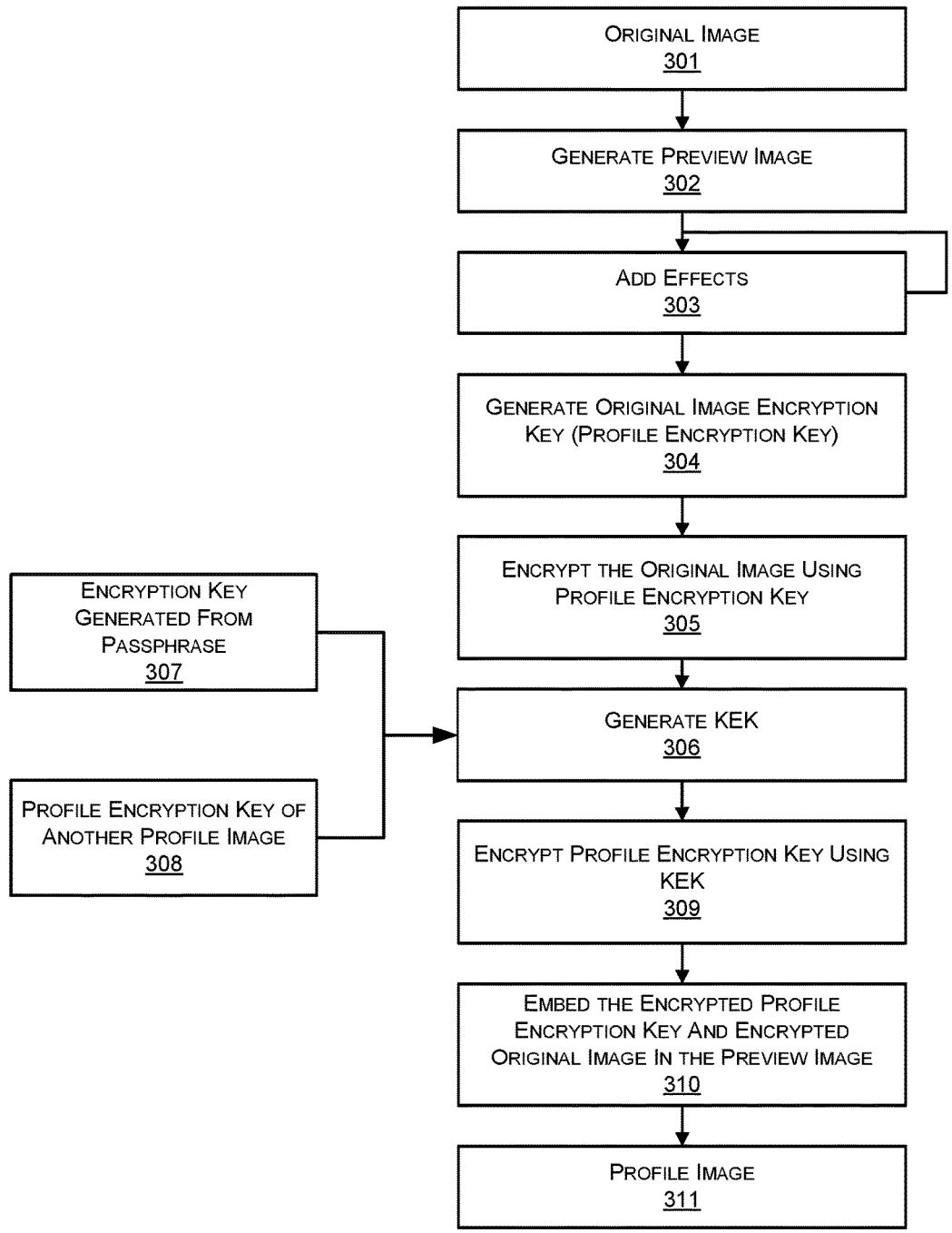
FIG. 3 is a flowchart showing a method of generating a profile image.

FIG. 3 shows a method of generating a profile image. As explained above, a profile image serves as a convenient way to encrypt and decrypt multiple protected images associated with the profile image wherein a KEK of encrypted encryption key of the protected image is generated based on the profile encryption key of profile image.

The original image (301) for profile image is received by the preview generator, and a preview image (302) is generated based on the original image or a different image. One or more effects (303) are applied to the preview image to remove the finer details of the preview image. For example, when an original image is provided, a preview image of the input image is a thumbnail or any image, which is cropped and/or resized. Effects such as blurring, smudging, contrast, and color modification, or other modifications is applied to the image so as not to reveal visual information that is present in the original image. As a next step, an encryption key—a profile encryption key (304)—is generated and the original image is encrypted using the profile encryption key (305). A KEK is then generated for encrypting the profile encryption key (306). The KEK is based on encryption key generated from a passphrase (307) and/or based on the profile encryption key of another profile image (308). The KEK is then used to encrypt the profile encryption key (309). The foregoing steps are repeated one or more times to generate multiple encrypted profile encryption keys encrypted with different KEKs. The encrypted original image and one or more encrypted profile encryption keys are then embedded as non-visual meta data of the preview image, thereby to generate a profile image (311). Only the preview image of the profile image is viewable using any normal image viewer.

Profile Image Decryption Method

Figure 4:
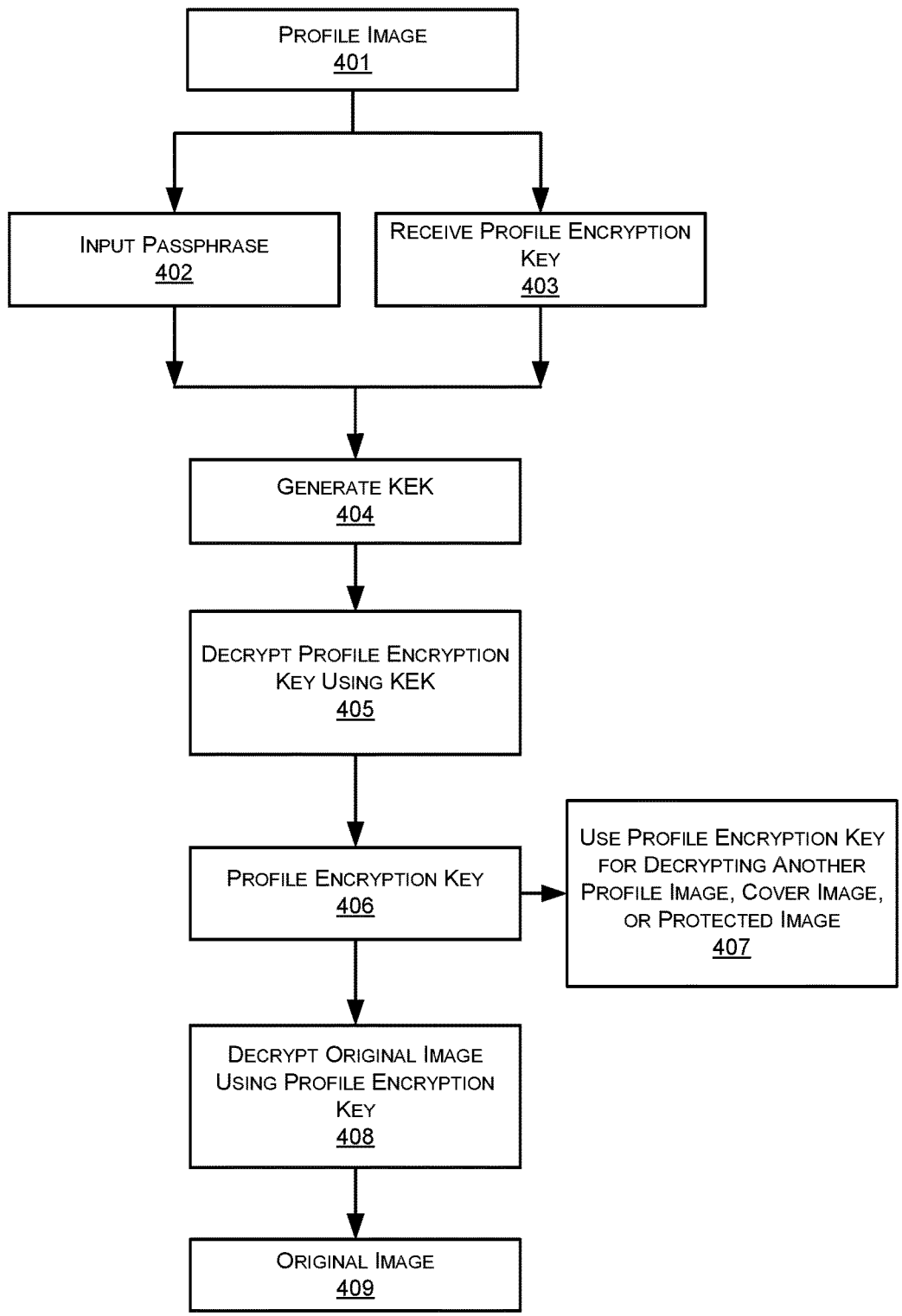
FIG. 4 is a flowchart showing a method of decrypting a profile image.

FIG. 4 shows a method of decrypting a profile image. The profile image (401) is received, and an input passphrase (402) and/or profile encryption key of another profile image is received (403). A KEK (404) is generated from the passphrase or based on the profile encryption key, as the case is. The KEK is used to decrypt to encrypted profile encryption key stored in metadata of the profile image (405). The profile encryption key decrypts the original image stored in the profile image metadata (408). If this profile image is the KEK of one or more protected images or cover images, the profile encryption key is KEK for decrypting encryption key of associated cover images or protected images (407).

Cover Image Encryption Method

Figure 5:
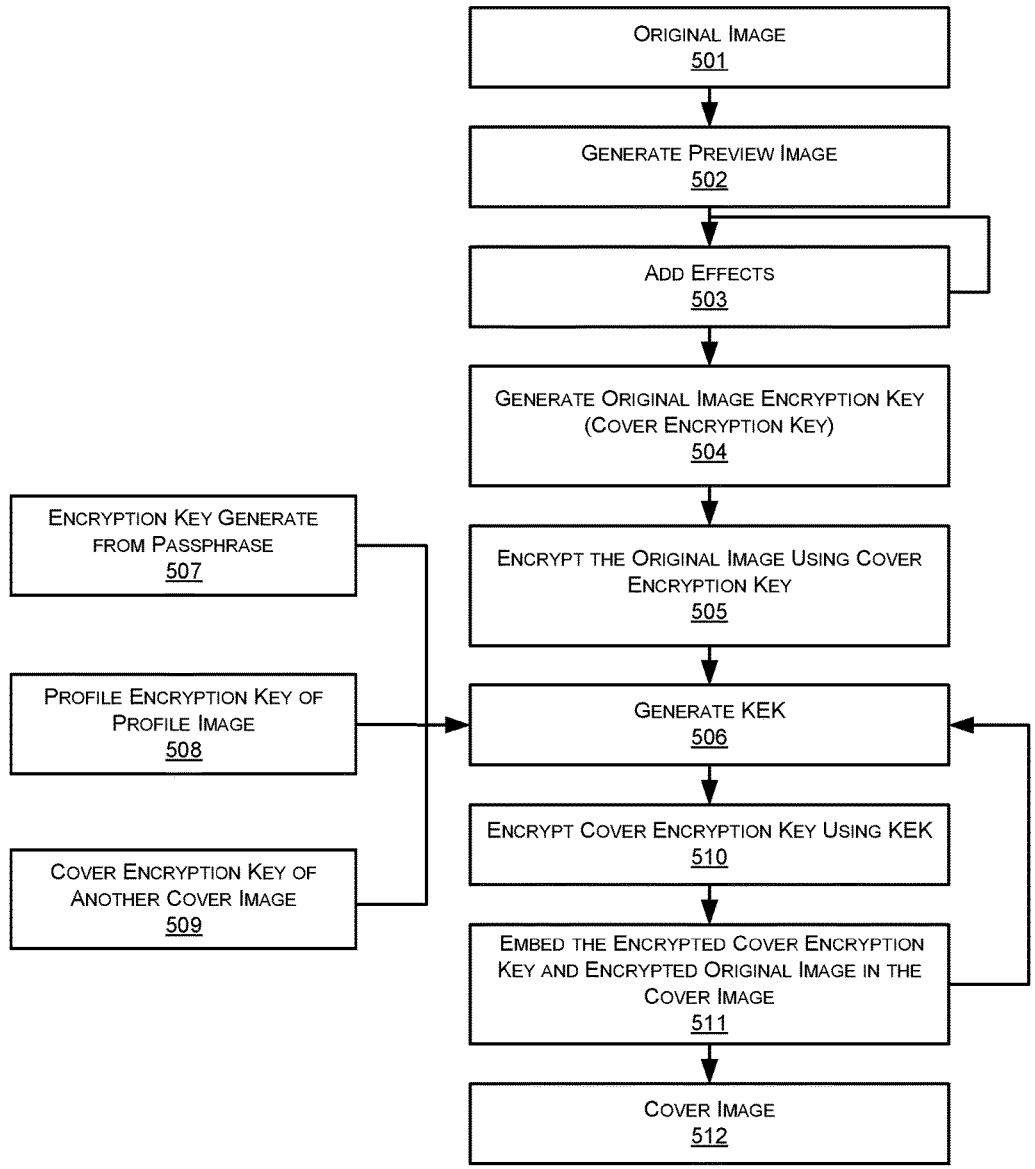
FIG. 5 is a flowchart showing a method of generating a cover image.

FIG. 5 shows a method for cover image encryption. Cover images enable sharing of logical groups of protected images. This logical group of protected images is termed an album of protected images. Cover images provide a convenient access to protected images in the album of protected images. A user authenticating the cover image can decrypt the associated protected images encryption key as the KEK of the encrypted encryption key is based on the cover encryption key of the cover image.

The cover image stores multiple encrypted cover encryption key encrypted by different KEK, for example a first encrypted cover encryption key encrypted using an encryption key generated from a passphrase, and a second encrypted cover encryption key encrypted using a profile encryption key of an associated profile image.

The original image (501) for the cover image is received by the preview generator, and a preview image is generated based on the original image (502) or a different image. One or more effects (503) are applied to the preview image to remove the finer details of the preview image. For example, when an original image is provided, a preview image is a thumbnail or any image, which is cropped and/or resized. Effects such as blurring, smudging, contrast, and color modification, or other modifications is applied to the preview image so as not to reveal visual information that is present in the original image. A cover encryption key (504)—is generated and the original image is encrypted using the cover encryption key (505). A KEK (506) is generated based on an encryption key generated from a passphrase (507) and/or based on the profile encryption key of a profile image (508) and/or based on the cover encryption key of another cover image (509). The KEK is used to encrypt the cover encryption key (510). The foregoing steps are repeated one or more times to generate multiple encrypted cover encryption keys encrypted by different KEKs. The encrypted original image and the one or more encrypted cover encryption keys are stored as non-visual Meta data of the preview image, thereby to generate a cover image. Only the preview image of the cover image is viewable using any normal image viewer.

Cover Image Decryption Method

Figure 6:
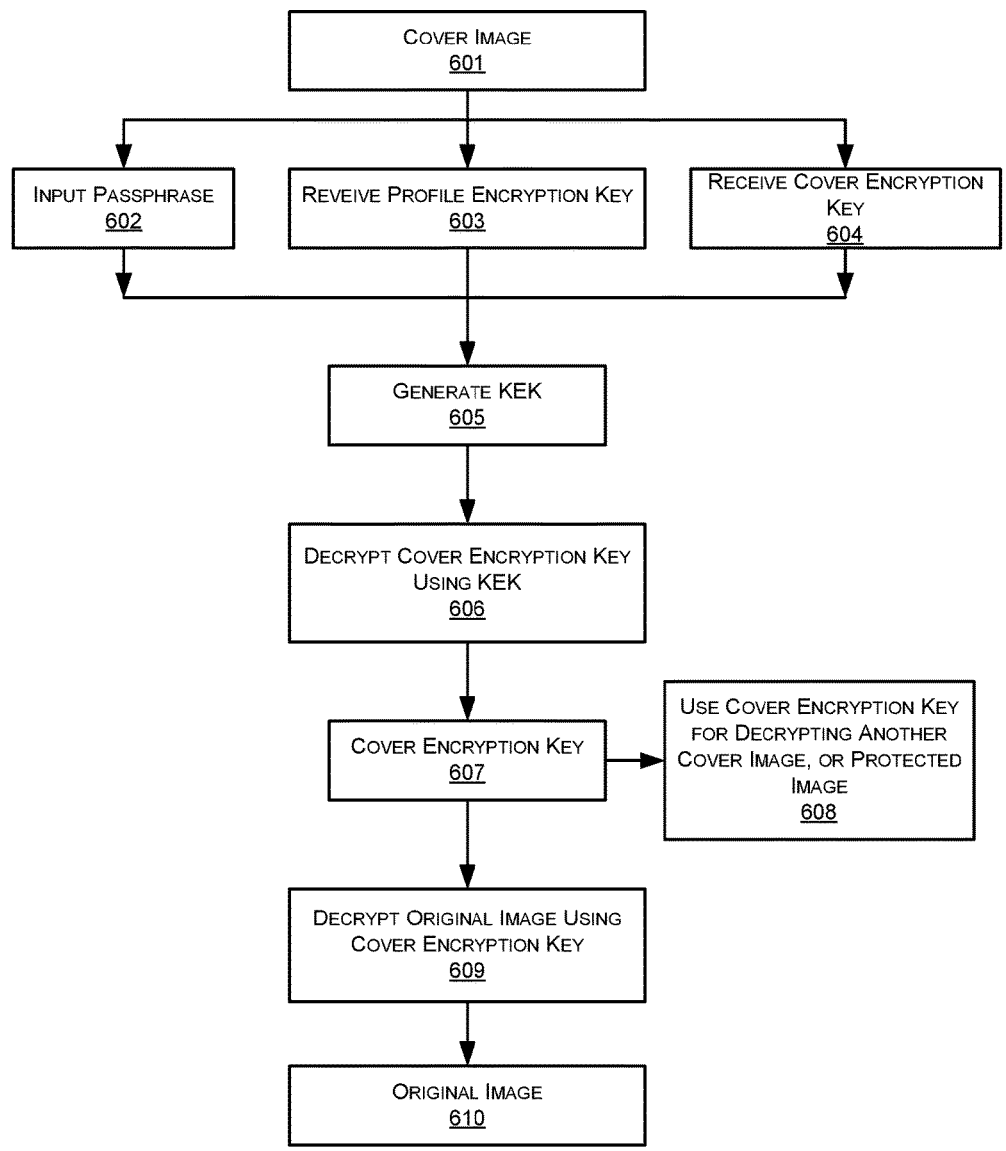
FIG. 6 is a flowchart showing a method of decrypting a cover image.

FIG. 6 shows a method of decrypting a cover image. The cover image (601) is received, and an input passphrase (602) and/or profile encryption key of profile image (603) and/or cover encryption key of another cover image (604) are received. As explained above, a cover image stores in its metadata one or more versions of its cover encryption key encrypted with different KEKs.

A KEK is generated from the passphrase or based on the profile encryption key or based on the other cover encryption key, as the case is (605). The KEK is used to decrypt the encrypted cover encryption key stored in the cover image metadata (606). The derived cover encryption key (607) is used to decrypt the original image (609) stored in the cover image as metadata. If this cover image is associated with one or more protected images or other cover images, the decrypted cover encryption key is (608) the KEK to decrypt the encrypted encryption key of the associated cover images or protected images.

Protected Image Encryption Method

Figure 7:
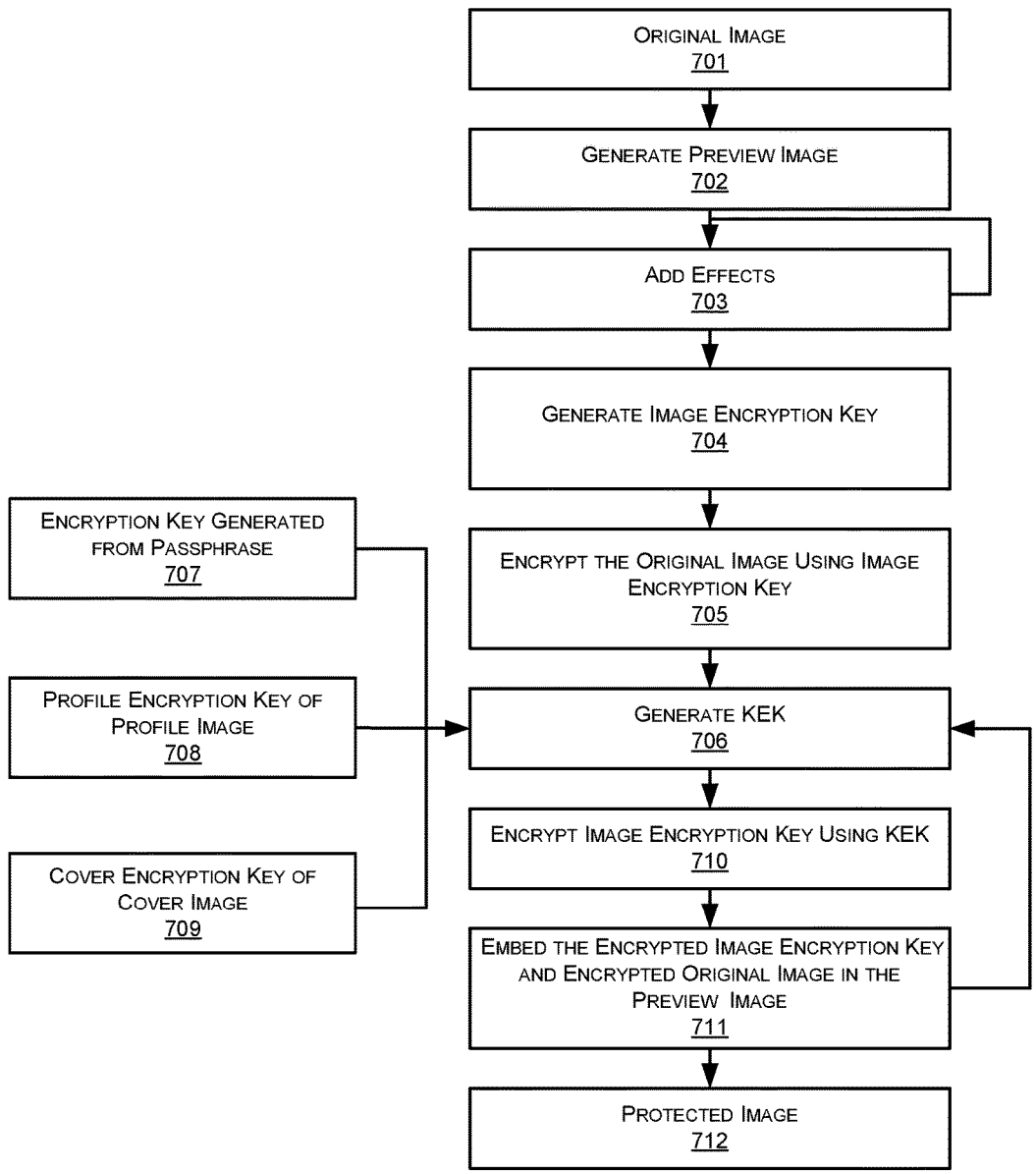
FIG. 7 is a flowchart showing a method of generating a protected image.

FIG. 7 shows a method of generating the protected image. The original image (701) for the protected image is received by the preview generator, and a preview image generated based on the original image or a different image (702). One or more effects (703) are applied to the preview image to remove the finer details of the preview image. For example, when an original image is provided, a preview image of the input image is a thumbnail or any image, which is cropped and/or resized. Effects such as blurring, smudging, contrast, and color modification, or other modifications is applied to the preview image so as not to reveal visual information that is present in the original image. As a next step, an encryption key is generated (704) and the original image is encrypted using the encryption key (705). One or more KEKs are generated for encrypting the encryption key (706). The KEK is encryption key generated from a passphrase (707) and/or based on the profile encryption key of a profile image (708) and/or based on a cover encryption key of a cover image (709). Each KEK is then used to encrypt the encryption key thereby to generate different encrypted encryption keys. The encrypted original image (710) and one or more encrypted encryption keys are then embedded as non-visual Meta data of the preview image (711), to generate a protected image. Only the preview image of the protected image is viewable using any normal image viewer.

Protected Image Decryption Method

Figure 8:
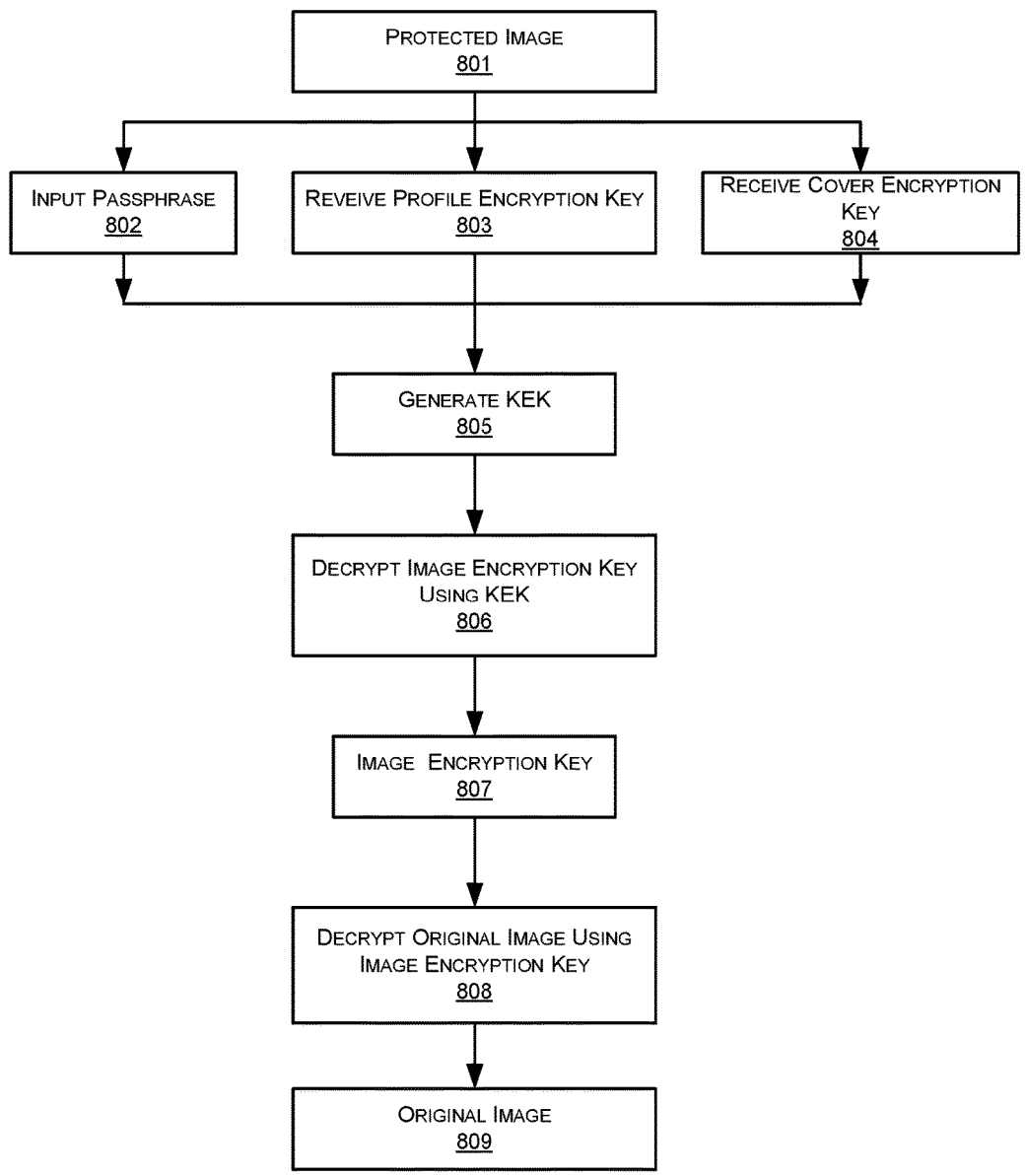
FIG. 8 is a flowchart showing a method of decrypting a protected image.

FIG. 8 shows a method of decrypting a protected image. The protected image (801) is received, and an input passphrase (802) and/or profile encryption key of a profile image (803) and/or cover encryption key of a cover image (804) are received. A KEK (805) generated based on the passphrase and/or based on the profile encryption key and/or based on the cover encryption key, as the case is. The KEK is used to decrypt the encrypted encryption key (806) embedded in the protected image metadata. The derived encryption key (807) is used to decrypt the original image stored in the protected image metadata (808).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

We claim:

1. A method of protecting visual and non-visual details of an original image to ensure privacy protection of the original image comprising:
   a) generating a preview image by applying one or more effects to obscure details of the original image;
   b) generating an encrypted original image by encrypting the original image by an encryption key;
   c) generating an encrypted encryption key by encrypting the encryption key with a Key Encryption Key (KEK); and
   d) generating a protected image by embedding the encrypted original image and the encrypted encryption key in non-visible metadata of the preview image, such that when said protected image is viewed on an image viewer, said image viewer will display said protected image as the preview image and not the original image,
   wherein a cover image associated with a profile image, stores multiple encrypted cover encryption keys that are encrypted by different KEKs, and wherein at least one encrypted cover encryption key of the multiple encrypted cover encryption keys is encrypted using an encryption key generated from a passphrase, and at least another encrypted cover encryption key of the multiple encrypted cover encryption keys is encrypted using a profile encryption key of the associated profile image.

2. The method of claim 1, wherein the method of generating the preview image of the profile image comprises the step of:
   a) receiving the original image for the profile image by the preview generator;
   b) generating the preview image based on the original image or a different image;
   c) selecting one or more effects from blurring, smudging, contrast, and color modification, and applying the selected one or more effects to the preview image to remove finer details of the preview image so that visual information present in the original image is hidden;
   d) generating the profile encryption key;
   e) encrypting the original image using the profile encryption key;
   f) generating the KEK for encrypting the profile encryption key based on an encryption key generated from one or more of the passphrase and a profile encryption key of another profile image;
   g) encrypting the profile encryption key using the KEK; and
   h) embedding the encrypted profile encryption key and the encrypted original image in the preview image thereby generating the profile image so that only the preview image of the profile image is viewable using the image viewer.

3. The method of claim 2, wherein steps 2f) to 2g) are performed one or more times to generate multiple encrypted profile encryption keys encrypted by one or more different key encryption keys (KEKs) and the encrypted original image and the one or more encrypted profile encryption keys are embedded as non-visual meta-data of the preview image, thereby generating the profile image.

4. The method of claim 2, wherein the method of decryption of the profile image comprises the steps of:
   a) receiving the profile image;

b) receiving one or more of the passphrase and the profile encryption key of the another profile image;
c) generating the KEK based on one or more of the passphrase and the profile encryption key;
d) decrypting the encrypted profile encryption key stored in the metadata of the profile image using the KEK; and
e) decrypting the encrypted original image stored in the metadata of the profile image using the profile encryption key to obtain the original image.

5. The method of claim 4, wherein the profile encryption key is used as the KEK to encrypt encryption key of associated cover images or protected images.

6. The method claim 1, wherein a cover image having embedded a cover image key encrypted with a cover image KEK enables sharing of a logical group of said cover image and one or more associated protected images, termed as an album, wherein each protected image of the album has embedded a protected image key encrypted with a protected image KEK, said protected image KEK based on the cover image key of said cover image, such that viewing an original image of the cover image enables a user to generate the protected image KEK of each protected image of the album, and thereby view the original image of each protected image of the album.

7. The method of claim 1, wherein method of generating the cover image comprising the steps of:
a) receiving the original image of the cover image by a preview generator;
b) generating the preview image based on the original image or a different image;
c) applying one or more effects selected from blurring, smudging, contrast, and color modification to the preview image to hide visual information that is present in the original image;
d) generating a cover encryption key;
e) encrypting the original image using the cover encryption key;
f) generating the KEK for encrypting the cover encryption key based on the encryption key generated from one or more of the passphrase, and the profile encryption key of the profile image, and a cover encryption key of another cover image;
g) using the KEK to encrypt the cover encryption key; and
h) embedding the encrypted original image and the encrypted cover encryption keys as non-visual meta-data of the preview image to generate the cover image.

8. A method of claim 7, wherein steps 8f) to 8g) are performed one or more times to generate multiple encrypted cover encryption keys encrypted by different KEK and store the encrypted original image and the one or more encrypted cover encryption keys as non-visual meta-data of the preview image to generate the cover image.

9. The method of claim 7, wherein method of decrypting the cover image comprises the steps of:
a) receiving the cover image;
b) receiving one or more of the passphrase, the profile encryption key of the profile image, and the cover encryption key of another cover image;
c) generating the KEK based on the passphrase or based on the profile encryption key or based on the other cover encryption key;
d) decrypting the encrypted cover encryption key stored in the cover image using the KEK to obtain the cover encryption key; and
e) decrypting the encrypted original image stored in the cover image as metadata, using the cover encryption key.

10. The method of claim 1, wherein the decrypted cover encryption key is KEK for decrypting the encryption key of the cover image.

11. The method of claim 7, wherein the cover image stores, in the metadata, one or more versions of the encrypted cover encryption key encrypted by a different KEK, and the cover image encryption key is derived by decrypting one of the encrypted cover encryption key using the associated KEK.

12. The method of claim 1, wherein the method of generating the protected image comprises:
a) receiving the original image for the protected image by the preview generator;
b) generating the preview image based on the original image;
c) applying one or more effects to the preview image so as to remove finer details of the preview image;
d) generating the encryption key;
e) encrypting the original image using the encryption key;
f) generating one or more KEKs for encrypting the encryption key, based on one or more of the encryption key generated from the passphrase and the profile encryption key of the profile image and the cover encryption key of a cover image;
g) encrypting the profile encryption key using each KEK, thereby to generate one or more encrypted profile encryption keys; and
h) embedding the encrypted original image and one or more encrypted encryption keys as non-visual metadata of the preview image, thereby to generate the protected image.

13. The method of claim 12, wherein decrypting the protected image comprises:
a) receiving said protected image, the passphrase and the profile encryption key of the profile image and the cover encryption key of the cover image;
b) generating KEK based on one or more of the passphrase and the profile encryption key based on the cover encryption key;
c) decrypting the encrypted encryption key stored in the protected image as metadata, using the KEK; and
d) decrypting the encrypted original image stored as metadata of the protected image to obtain the original image, using the encryption key.

14. An apparatus for protecting the visual and non-visual details of an image, the apparatus comprises:
a processor coupled to a memory, the memory storing computer readable instructions executable by the processor to implement:
a) a preview generator, that receives an original image from one or more of a storage device, a network, and a camera and generates a preview image based on at least one of a different image and the original image by applying one or more effects selected from blurring, smudging, modifying contrast, changing color, neutralizing color, and cropping so as to modify the image such that at least a part of details in the original image is hidden in the preview image;
b) an encryption key generator, which generates an encryption key used to encrypt the original image and generates key encryption keys (KEKs) based on one or more of a passphrase and an encryption key which is used to encrypt a different original image;
c) a protected image generator, which generates a protected image, the protected image stores metadata, one or more encrypted encryption keys, encrypted with the KEK, based on encryption key of one or more of a profile image and cover image;

d) a profile image Generator that generates profile image used to relate and enable access to one or more associated protected images, cover image, and other profile image;

e) a cover image generator that generates a cover image and the cover image a protected image used to relate and enable access to any or a combination of one or more associated protected images, the cover image as with the profile image, wherein the cover image associated with the profile image, stores multiple encrypted cover encryption keys encrypted by different KEKs, and wherein an encrypted cover encryption key of the multiple encrypted cover encryption keys is encrypted using an encryption key generated from a passphrase, and another encrypted cover encryption key of the multiple encrypted cover encryption keys is encrypted using a profile encryption key of the associated profile image;

f) an encryptor which encrypts the original images using an encryption key generated from the encryption key generator and stores the encrypted original images as non-visual data along with the other information generated by the encryption key generator in such a way that when the protected image is viewed using an image viewer the preview image is displayed, and;

g) a decryptor, which decrypts the protected image based on a passphrase or one or more KEKs to decrypt the encrypted encryption key stored in the protected image and encryption key is used to decrypt the encrypted original image to obtain the original image.

* * * * *